(12) United States Patent
Van Wageningen

(10) Patent No.: US 12,003,274 B2
(45) Date of Patent: Jun. 4, 2024

(54) SYSTEMS AND METHODS FOR ENABLING HIGH-SPEED WIRELESS FILE TRANSFER

(71) Applicant: SIGNIFY HOLDING B.V., Eindhoven (NL)

(72) Inventor: Andries Van Wageningen, Wijlre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 137 days.

(21) Appl. No.: 17/641,621

(22) PCT Filed: Aug. 28, 2020

(86) PCT No.: PCT/EP2020/074115
§ 371 (c)(1),
(2) Date: Mar. 9, 2022

(87) PCT Pub. No.: WO2021/047925
PCT Pub. Date: Mar. 18, 2021

(65) Prior Publication Data
US 2022/0360329 A1    Nov. 10, 2022

(30) Foreign Application Priority Data
Sep. 13, 2019    (EP) .................................... 19197239

(51) Int. Cl.
*H04B 10/114* (2013.01)
*H04B 10/116* (2013.01)
*H04L 67/06* (2022.01)

(52) U.S. Cl.
CPC ............ *H04B 10/116* (2013.01); *H04L 67/06* (2013.01)

(58) Field of Classification Search
CPC .................................................. H04B 10/114
See application file for complete search history.

(56) References Cited

U.S. PATENT DOCUMENTS

| 7,974,536 | B2 | 7/2011 | Yu et al. |
| 8,942,564 | B2 | 1/2015 | Jovicic et al. |

(Continued)

FOREIGN PATENT DOCUMENTS

| CN | 202205167 U | 4/2012 |
| WO | 2017179815 A1 | 10/2017 |

OTHER PUBLICATIONS

RFC 959, "File Transfer Protocol (FTP)", IETF, 1985 (Year: 1985).*

*Primary Examiner* — Shi K Li

(57) ABSTRACT

Given the potential high data rate and privacy of Optical Wireless Communication, Li-Fi turns out to be an attractive technology for enabling high-speed wireless data transfer between remote devices. This invention is directed to various methods, systems and apparatus for enabling high-speed file transfer via a high-speed Li-Fi link (200) between a user-held apparatus (300) and a remote device (400). Upon a trigger command received by the user-held apparatus (300), a trigger signal is sent to the remote device (400) via another communication link (500) having a wide beam width. The remote device (400) provides a human perceivable indication of a dedicated reception area after receiving the trigger signal to assist a user to adjust the user-held apparatus (300) for an alignment needed to enable the high-speed Li-Fi link (200). The high-speed file transfer starts after the alignment status is determined allow for file transfer, or a start-to-send command is received by the user-held apparatus (300).

14 Claims, 4 Drawing Sheets

(56) References Cited

U.S. PATENT DOCUMENTS

| | | | |
|---|---|---|---|
| 9,971,426 B2 | 5/2018 | Bostick et al. | |
| 10,111,305 B2 | 10/2018 | Tran | |
| 2011/0033181 A1 | 2/2011 | Jang et al. | |
| 2013/0101285 A1* | 4/2013 | Shar | H04B 10/1149 |
| | | | 398/127 |
| 2013/0132632 A1* | 5/2013 | Tanaka | H04B 10/40 |
| | | | 710/305 |
| 2015/0201443 A1 | 7/2015 | Emani et al. | |
| 2016/0049831 A1* | 2/2016 | Nakano | G01R 29/0878 |
| | | | 307/104 |
| 2016/0072580 A1* | 3/2016 | Wabnig | H04L 9/0852 |
| | | | 398/131 |
| 2021/0035343 A1* | 2/2021 | Yoshida | G06T 11/60 |

* cited by examiner

SYSTEMS AND METHODS FOR ENABLING HIGH-SPEED WIRELESS FILE TRANSFER

CROSS-REFERENCE TO PRIOR APPLICATIONS

This application is the U.S. National Phase application under 35 U.S.C. § 371 of International Application No. PCT/EP2020/074115, filed on Aug. 28, 2020, which claims the benefit of European Patent Application No. 19197239.7, filed on Sep. 13, 2019. These applications are hereby incorporated by reference herein.

FIELD OF THE INVENTION

The invention relates to the field of high-speed file transfer via optical wireless networks, such as Li-Fi networks. More particularly, various methods, apparatus, systems and computer-readable media are disclosed herein related to improvement in establishing a high-speed Li-Fi link between a user-held apparatus and a remote device.

BACKGROUND OF THE INVENTION

To enable more and more electronic devices like laptops, tablets, and smartphones to connect wirelessly to the Internet for enriched contents, wireless communication confronts unprecedented requirements on data rates and also link qualities, and such requirements keep on growing year over year, considering the emerging digital revolution related to Internet-of-Things (IoT). Radio frequency technology like Wi-Fi is running out of spectrum to support this revolution fully. In the meanwhile, Li-Fi is drawing more and more attention with its capability to support higher data rates over the wider bandwidth in visible light, ultraviolet, and infrared spectrums. Other benefits of Li-Fi include data security, and the ability to function safely in areas otherwise susceptible to electromagnetic interference. Therefore, Li-Fi is a very promising technology to enable the next generation of immersive connectivity.

Visible-light communication (VLC) transmits data by intensity modulating optical sources, such as light emitting diodes (LEDs) and laser diodes (LDs), faster than the persistence of the human eye. VLC merges lighting and data communications in applications such as area lighting, signboards, streetlights, vehicles, and traffic signals. The IEEE 802.15.7 visible-light communication personal area network (VPAN) standard maps the intended applications to four topologies: peer-to-peer, star, broadcast and coordinated. Optical Wireless PAN (OWPAN) is a more generic term than VPAN also allowing invisible light for communication.

Given the potential high data rate and confidentiality brought by Li-Fi or Optical Wireless Communication (OWC), it turns out to be an attractive technology for enabling high-speed wireless data transfer between remote devices.

US2015201443 A1 relates to methods and systems for establishing an infrared (IR) triggered radio communication connection between two devices. Upon aligning IR ports, IR trigger messages can be exchanged between devices and/or access points using an IR communication link, where the IR trigger messages indicate intent and capability of establishing the connection. The IR trigger messages may trigger device discovery and connection using the radio communication technology.

US2011033181 A1 is related to a visible light communication technology capable of intuitively recognizing a transmission speed, an alignment state, a communication state, or a transmission rate. A visible light communication apparatus according to an embodiment of the present invention includes: a light source selecting unit selecting at least one light source from among a plurality of light sources generating lights having different wavelengths by considering intuitive information distinguished depending on a wavelength in a visible light band; and a visible light communication unit performing visible light communication by at least one selected light source to allow the intuitive information to be recognized by a color corresponding to at least one selected light source.

SUMMARY OF THE INVENTION

In view of the above, the present disclosure is directed to methods, apparatus, systems, computer program and computer-readable media for providing an easy-to-use high-speed wireless file transfer connection between remote devices. More particularly, various computer-readable media (transitory and non-transitory), methods, systems and apparatus are provided for enabling high-speed file transfer via a high-speed Li-Fi link between a user-held apparatus and a remote device.

In accordance with a first aspect of the invention a system is provided. The system for enabling high-speed file transfer via a high-speed Li-Fi link between a user-held apparatus and a remote device, the system comprising the user-held apparatus comprising a first transmitter, a Li-Fi transmitter, a first user interface, UI; the remote device comprising a second receiver, a second Li-Fi receiver, a second UI; and wherein the user-held apparatus is configured to send a trigger signal from the first transmitter to the remote device for setting up the high-speed Li-Fi link upon receipt of a trigger command via the first UI; and the remote device is configured to provide a human perceivable indication via the second UI about a dedicated reception area on the remote device upon receipt of the trigger signal by the second receiver, to assist adjustment of a position and/or an orientation of the user-held apparatus to point the Li-Fi transmitter to the dedicated reception area; provide feedback on an alignment status between the Li-Fi transmitter in the user-held apparatus and the dedicated reception area; and the user-held apparatus is further configured to transmit a file from the Li-Fi transmitter to the second Li-Fi receiver in the remote device via the high-speed Li-Fi link when the alignment status provided by the remote device is determined to allow for file transfer, or a start-to-send command is received via the first UI; and wherein the trigger signal sent from the first transmitter is via another link different from the high-speed Li-Fi link, which can be based on at least one of an infrared link, a radio frequency link, and another optical link with wider beam width than the high-speed Li-Fi link.

Because of the high bandwidth capacity over unlicensed optical wavelength, optical communication turns to be a very attractive technology for broadband wireless communication, such as live streaming and remote file transfer. However, to enable a high-speed optical link between two remote devices typically requires quite complex system setup and procedures, such as tunable beam divergence control for link acquisition and data transfer. This invention proposes a system to simplify the interaction between the system and a user, and advantageously, to establish the high-speed file transfer connection between a user-held apparatus and a remote device in an easy-to-control manner. Note that the user-held apparatus should be understood as a mobile device or a handheld device, such as a laser pointer, a remote controller, a smart phone, a tablet, or a laptop, which has hardware to support optical communication. The remote device can be a remote display device, such as a TV, a projector, a monitor, or an interactive screen. The remote device can also be a storage device, which is deployed to collect, organize, and backup data. The data storage in the remote device can be "permanent" (for longer period), but can also be temporary in order to transfer/relay the data to a (cloud) server.

Upon a trigger command from a user via the first UI, a trigger signal is sent by the user-held apparatus to the remote device. The trigger signal is sent via a link different from the high-speed Li-Fi link. Since the trigger signal contains very limited information, there is no hard data rate requirement on this link, which is mainly used for the exchange of control signals. In principle, any short-range wireless communication standards should work, as long as it has lower directivity compared to the high-speed Li-Fi link. This way the trigger signal can be sent to the remote device without any special alignment.

Note that to allow for high-speed data transfer within certain power limit, the beam width of the narrow high-speed Li-Fi link is typically no more than 20 degrees, given that the distance from the user-held apparatus to the remote device can be up to a few meters. Preferably, the beam width of the narrow high-speed Li-Fi link is kept within 6 degrees. On the other hand, the beam width of the other link is typically at least 30 degrees to cover a large area, and preferably above 45 degrees. In this way, the remote device can be easily triggered to provide the human perceivable indication to gain the user's attention, and hence, a further adjustment of the user-held apparatus can be made to prepare for the high-speed Li-Fi link.

When there is more than one remote device in a single room, it can be beneficial to let the other link have certain selectivity to avoid a false trigger to another remote device accidentally. In that case, the beam width of the other link might be narrower, such as below 30 degrees, but at least two to three times the beam width of the high-speed Li-Fi link.

In response to the trigger signal, the remote device provides a human perceivable indication via a second UI about a dedicated reception area on the remote device. As such, the user receives an immediate response from the remote device, which helps the user to quickly recognize the way of interaction between the apparatus at hand and the device from remote. The user perceivable indication can be implemented by at least one of illuminating the dedicated reception area, illuminating a light strip enclosing the dedicated reception area, displaying an arrow pointing to the dedicated reception area, displaying a description of a relative location of the dedicated reception area on the remote device, a voice message indicating the dedicated reception area. In another example, the remote device comprises a display area with the second Li-Fi receiver integrated behind the display. The human perceivable indication can be provided by presenting the dedicated reception area on the display directly.

Given that the relative size of the dedicated reception area for Li-Fi signals is typically much smaller as compared to the remote device, such a human perceivable indication of the reception area can be very beneficial for the user to adjust the position or orientation of the user-held apparatus, especially considering the typical narrow beam of the high-speed Li-Fi link. The Li-Fi transmitter may also send predefined testing signals or dummy data in the testing phase of the Li-Fi link, and the remote device is configured to provide feedback on the alignment status. The alignment status indicates if a beam of the Li-Fi transmitter in the user-held apparatus is fully or partially aligned with the reception area on the remote device. In one example, the alignment status can be a text or voice message, a binary value, a ratio or a percentage. The alignment is determined to be sufficient if the transmitter beam is fully aligned with the reception area, or if the overlapping part of a transmission beam and the reception area is above a predetermined threshold, or a configurable threshold derived from one or more parameters, such as the required data rate, and the actual link quality condition. Typically, with a better link quality condition, a higher data rate can be supported. And hence, less time is needed to transfer a certain file over the Li-Fi link, given a more high-level system criteria, such as a typical time interval that a user is able to hold the user-held apparatus stably in a fixed position.

Preferably, the trigger signal may further comprise identification information of the user-held apparatus, which enables the remote device to identify each user-held apparatus out of multiple devices attempting to establish a high-speed Li-Fi link simultaneously. The remote device could typically establish one high-speed Li-Fi link with one apparatus at a time, e.g. by rejecting a second trigger until the file transfer is completed with the first apparatus. Furthermore, the identification information may be employed in a security protocol, etc. allowing only trusted user-held apparatus to establish a high-speed Li-Fi link or providing the high-speed Li-Fi link with user-held apparatus specific cryptography mechanisms.

Advantageously, the first transmitter and second receiver have a lower active power consumption than the Li-Fi transmitter and the second Li-Fi receiver, respectively.

The other link via the first transmitter in the user-held apparatus to the second receiver in the remote device may be used as a wake-up mechanism to wake up the high performance and high power consumption Li-Fi link. In the remote device, the second receiver is supposed to monitor the channel to detect a potential trigger signal by remaining active all the time or applying a certain duty cycling, while the second Li-Fi receiver may be in a sleep mode most of the time until a valid trigger signal is detected. With lower active power consumption of the first transmitter and the second receiver as compared to the Li-Fi transmitter and the second Li-Fi receiver, the average system power consumption is reduced.

In one embodiment, the feedback from the remote device further comprises at least one of: an instruction on a direction in which to adjust the position and/or an orientation of the user-held apparatus; link quality information of the high-speed Li-Fi link; and, a recommendation for further improving the link quality; and the feedback can be provided either directly via the second UI, or via a feedback signal sent by a second transmitter comprised in the remote device via the other link to the user-held apparatus.

The feedback from the remote device to the user-held apparatus may contain more information besides the alignment status, for example information to assist the user in a proactive approach. Thus, the system becomes more responsive, and it may help to speed up the link establishment procedure for the high-speed Li-Fi link.

Preferably, the remote device is further configured to provide another feedback during or after the file transfer; and wherein the other feedback comprises at least one of: a status of transfer on-going, a status of transfer interrupted, a status of transfer completed, link quality information, an acknowledgement for receipt of the file, an acknowledgement for receipt of part of the file, and a negative acknowledgement for receipt of the file.

In addition to the feedback during the link establishment, it is recognized by the applicant that it is beneficial to have the other feedback during or after the file transfer. The link quality information can be real-time link quality information or average link quality information during the file transfer. Such feedback provides the user with confirmation on an on-going file transfer or a recent file transfer. It may also help the user to identify any link problem during the file transfer, such as a sudden link breakdown due to an unconscious shaking movement of the hand.

In one embodiment, the user-held apparatus is further configured to switch on the Li-Fi transmitter upon receipt of the trigger command via the first UI; and switch off the Li-Fi transmitter after the transmission of the file to the remote device via the high-speed Li-Fi link is completed, or aborted by the user, or ended due to interruption.

In another embodiment, the remote device is further configured to switch on the second Li-Fi receiver upon receipt of the trigger signal; and switch off the second Li-Fi receiver after the reception of the file from the user-held device via the high-speed Li-Fi link is completed, or aborted by the user, or ended due to interruption, or a predefined timer expires.

Given the high-power consumption of the Li-Fi transmitter in the user-held apparatus and the second Li-Fi receiver in the remote device, it is preferable to switch on the Li-Fi transmitter and second Li-Fi receiver on demand, and then to switch them off when the arranged activity is accomplished.

Advantageously, the user-held apparatus is further configured to highlight a projected transmission area by emitting a visible light beam to further assist adjustment of a position and/or an orientation of the user-held apparatus to point the Li-Fi transmitter to the dedicated reception area on the remote device Considering the high directivity of the high-speed Li-Fi beam and the distance between the user-held apparatus and the remote device, it is beneficial to employ a visible light beam to highlight a projected transmission area. And hence, it is more straight-forward for the user to align the emitted beam to the dedicated reception area on the remote device.

A typical human eye will respond to wavelength from about 380 nm to 740 nm, which also corresponds to a visible spectrum band in the vicinity of 430-770 THz. Li-Fi is a broader term, which covers visible light, as well as ultraviolet and infrared spectrums. Such visible light beam may be enabled only in the link establishment phase to assist the user, and the Li-Fi transmitter may switch to other spectrums with more bandwidth for high-speed file transfer. In one example, the visible light beam can be arranged by letting the Li-Fi transmitter emitting in the visible spectrum band during the link establishment phase. In another example, the visible light beam can be arranged by activating a second beam together with the high-speed Li-Fi beam in the visible spectrum band, which is aligned with the high-speed Li-Fi beam and with similar beam width. To further assist the alignment of the high-speed Li-Fi beam, this second (low cost) beam might also be used to convey additional information by modulating the second beam at a low bit rate. Of course, the modulation on the second beam is not necessary. In a further example, the visible light beam is used as the high-speed Li-Fi beam in both the link establishment phase and the data transfer phase. In both phases, the visible light beam is projected with the same beam width, but may be modulated with different bit rates. For example, in the link establishment phase, the visible light beam may be modulated at a low bit rate to save power, whereas in data transfer phase the beam is modulated at a much higher bit rate in order to transfer a large file within a short time period.

In another embodiment, the user-held apparatus further comprises a Li-Fi receiver, the remote device further comprises a second Li-Fi transmitter, and the user-held apparatus is configured to send a second trigger signal from the first transmitter to the remote device for setting up the high-speed Li-Fi link upon receipt of a second trigger command via the first UI; and the remote device is configured to provide a human perceivable indication via the second UI about a dedicated transmission area on the remote device upon receipt of the second trigger signal by the second receiver, to assist adjustment of a position and/or an orientation of the user-held apparatus to point the Li-Fi receiver to the dedicated transmission area; and the user-held apparatus is further configured to evaluate an alignment status between the Li-Fi receiver and the dedicated transmission area; send a third trigger signal from the first transmitter to the remote device for starting the high-speed Li-Fi link when the alignment status is determined to allow for file transfer, or a start-to-receive command is received via the first UI; and the remote device is further configured to transmit a file from the second Li-Fi transmitter to the Li-Fi receiver via the high-speed Li-Fi link upon receipt of the third trigger signal.

It is advantageously disclosed that the Li-Fi link may be established in the opposite direction to enable the file transfer from the remote device to the user-held apparatus. This may happen when a user A first shared an album with holiday photos to a remote projector, and then another user B, such as a friend of A, would like to get a copy of the album as well when he is browsing the presentation of the album via the projector.

Given it is the user who takes the initiative to enable the opposite link, the establishment of the opposite link is triggered by a second trigger command via the first UI. And then the remote device provides a human perceivable indication of the dedicated transmission area. The user-held apparatus is further configured to evaluate the alignment status, and to make the decision if the alignment status is sufficient to allow for file transfer. Then the user-held apparatus sends a third trigger signal to request the remote device to start the file transfer.

In a second aspect of the invention a user-held apparatus is provided. The user-held apparatus for enabling high-speed file transfer to a remote device via a high-speed Li-Fi link, the user-held apparatus comprising a first user interface, UI, configured to receive a trigger command; a first transmitter configured to send a trigger signal to the remote device for setting up the high-speed Li-Fi link upon receipt of the trigger command; a Li-Fi transmitter configured to transmit a file to a second Li-Fi receiver in the remote device via the high-speed Li-Fi link, when an alignment status provided by the remote device is determined to allow for file transfer, or a start-to-send command is received via the first UI; and wherein the trigger signal sent from the first transmitter is via another link different from the high-speed Li-Fi link, which can be based on at least one of an infrared link, a radio frequency link, and another optical link with wider beam width than the high-speed Li-Fi link.

In one example, the user-held apparatus further comprises a memory to store the file to be transmitted. In another example, the file is not stored locally, but is downloaded at run time via another air interface, such as BLE, Zigbee, WiFi, or 3G/4G/5G cellular network. Given the maximum data rate to be supported via the other air interface, the time needed to download a large file, such as a movie, may be quite long which can result in bad user experience. Possibly a large file is transferred in chunks over the other air interface. Each time when a chunk of the file is downloaded on the user-held device, the user receives a notification on ready-to-transfer of this chunk. The size of a chunk may be determined by the actual data rate supported on the other air interface, the total size of the file, or the segmentation of the file itself, such as the part of a movie between two advertisements.

In a further embodiment, the user-held apparatus comprising a first receiver configured to receive feedback on the alignment status from the remote device via the other link; a controller configured to determine if the alignment status allows for file transfer.

It is advantageous that the feedback on the alignment status is received by the user-held apparatus from the remote device via the other link, and hence the decision can be made automatically by the controller in the user-held apparatus if the alignment status is sufficient to allow for file transfer. In this way, the system is more spontaneous, and the involvement of a user is reduced. Typically, this also indicates the high-speed Li-Fi link can be established faster and more conveniently.

In another example, actual file transfer on the high-speed Li-Fi link may start only when both conditions are met, such as when the feedback on the alignment status received via the other link is determined to be sufficient, and a start-to-send or start-to receive command is received via the first UI.

In a third aspect of the invention a remote device is provided. The remote device for accommodating high-speed file reception from a user-held apparatus via a high-speed Li-Fi link, the remote device comprising a second receiver configured to receive a trigger signal from the user-held apparatus for setting up the high-speed Li-Fi link; a second user interface, UI, configured to provide a human perceivable indication about a dedicated reception area on the remote device, upon receipt of the trigger signal; a second Li-Fi receiver configured to receive a file from a Li-Fi transmitter in the user-held apparatus via the high-speed Li-Fi link; and wherein the remote device is further configured to provide a feedback on an alignment status between the Li-Fi transmitter comprised in the user-held apparatus and the dedicated reception area; and wherein the trigger signal received by the second receiver is via another link different from the high-speed Li-Fi link, which can be based on at least one of an infrared link, a radio frequency link, and another optical link with wider beam width than the high-speed Li-Fi link.

Preferably, the remote device further comprising a second transmitter; and wherein the second transmitter is configured to send the feedback on the alignment status to the user-held apparatus via the other link.

In another example, the feedback on the alignment status is provided via the second UI in the remote device. Such human perceivable feedback via the second UI may trigger the user to provide a start-to-send command via the first UI to the user-held apparatus.

Advantageously, another feedback from the remote device can be provided in a similar manner, either via the second UI of the remote device or by sending the other feedback to the user-held apparatus directly via the other link. The other feedback can be provided during or after the high-speed file transfer, which may comprise at least one of: a status of transfer on-going, a status of transfer interrupted, a status of transfer completed, link quality information, an acknowledgement for receipt of the file, an acknowledgement for receipt of part of the file, and a negative acknowledgement for receipt of the file.

Another aspect of the invention is the method of a user-held apparatus for enabling high-speed file transfer to a remote device via a high-speed Li-Fi link. The method comprising receiving a trigger command via a first user interface, UI; sending a trigger signal from a first transmitter to the remote device for setting up the high-speed Li-Fi link upon receipt of the trigger command; transmitting a file from a Li-Fi transmitter to a second Li-Fi receiver in the remote device via the high-speed Li-Fi link, when an alignment status provided by the remote device is determined to allow for file transfer, or a start-to-send command is received via the first UI, and wherein the trigger signal sent from the first transmitter is via another link different from the high-speed Li-Fi link, which can be based on at least one of an infrared link, a radio frequency link, and another optical link with wider beam width than the high-speed Li-Fi link.

A further aspect of the invention is the method of a remote device for accommodating high-speed file reception from a user-held apparatus via a high-speed Li-Fi link. The method comprising receiving by a second receiver a trigger signal from the user-held apparatus for setting up the high-speed Li-Fi link; providing a human perceivable indication about a dedicated reception area on the remote device via a second user interface, UI, upon receipt of the trigger signal; provide a feedback on an alignment status between a Li-Fi transmitter comprised in the user-held apparatus and the dedicated reception area; receiving a file by a second Li-Fi receiver from the Li-Fi transmitter via the high-speed Li-Fi link; and wherein the trigger signal received by the second receiver is via another link different from the high-speed Li-Fi link, which can be based on at least one of an infrared link, a radio frequency link, and another optical link with wider beam width than the high-speed Li-Fi link.

The invention may further be embodied in a computer program comprising code means which, when the program is executed by a computer, cause the computer to carry out the methods of the user-held apparatus and the remote device.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

Figure 1:
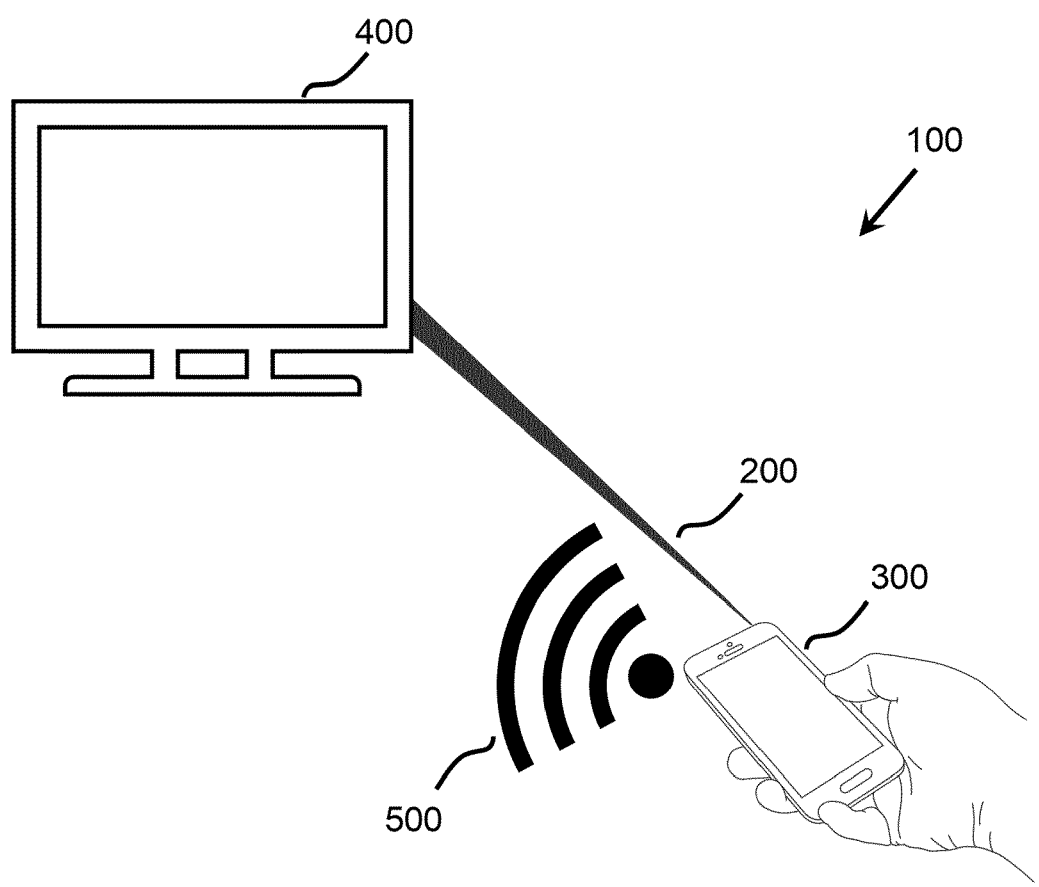
FIG. 1 demonstrates a system for enabling high-speed file transfer via a high-speed Li-Fi link via a high-speed Li-Fi link between a user-held apparatus and a remote device.

Various embodiments of the present invention will now be described based on as shown in FIG. 1. A system 100 is demonstrated to enable high-speed file transfer between a user-held apparatus 300 and a remote device 400 via a high-speed Li-Fi link 200. A target speed of the data link is to transfer a large file within a few seconds or even less, e.g.

a file of one Gigabyte (GB) to be transferred within one second. To support such a high data transfer speed, the user-held apparatus typically employs narrow beams, instead of wide beams, given a certain power limit imposed on the system. Furthermore, because of the small projection area, a narrow beam also improves security and reduces potential interference with other Li-Fi communication links. And hence, it also allows the user to be selective in establishing a link with an intended remote device.

Given that the high-speed Li-Fi link is typically with narrow beam width, to enable a high-speed optical link between two remote devices may require quite complex system setup and procedures, such as tunable beam divergence control for link acquisition and data transfer. Thus, a dedicated controllable beam divergence device and tunable lens may be needed to shape and/or to steer the beam to achieve certain link quality for data communication. Such devices may be quite bulky for a user-held apparatus, which also leads to extra cost of the system.

This invention proposes a system to simplify the interaction between the system and a user, and advantageously, to establish the high-speed file transfer connection between a user-held apparatus and a remote device in an easy-to-control manner. For illustration purposes, example devices are shown in the figure. In this example, a smart phone is adopted as a user-held apparatus, and a TV is adopted as a remote device. Such examples should not be understood as limiting the scope of the invention. The user-held apparatus can also be a laser pointer, a remote controller, a tablet, or a laptop, which has hardware support for optical communication. The remote device can be a remote display device, or a remote storage device. The trigger signal is sent via the other link 500, which can be an infrared link, a radio frequency link, and another optical link with wider beam width as compared to the high-speed Li-Fi link 200. The radio frequency link can be based on a BLE, Zigbee, WiFi, or 3G/4G/5G cellular standard. Considering the typical propagation property or antenna pattern of the other link, no special alignment is needed to establish the other link. And hence the other link is used as a communication medium for the signaling exchange to establish the highly directive Li-Fi link.

Although the main use case is that the user-held apparatus transmits a file to a remote display device or storage device, it is also possible that the Li-Fi link is established in the opposite direction to enable the file transfer from the remote device to the user-held apparatus, such as for another user to retrieve the file from the remote device.

Figure 2:
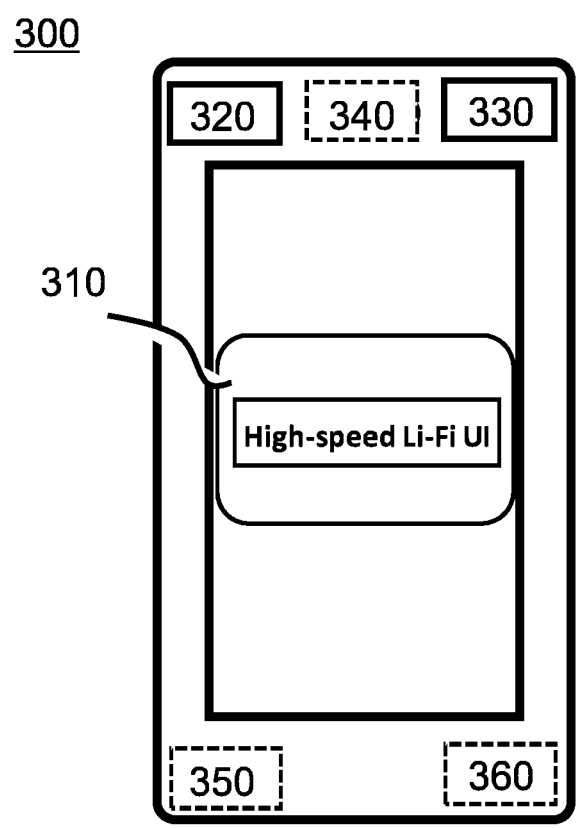
FIG. 2 illustrates the setup of a user-held apparatus.

FIG. 2 illustrates the setup of a user-held apparatus 300. The blocks with solid lines 310, 320, 330 are the most essential building blocks to enable this invention. The first UI 310 is mainly deployed to receive the user command, and potentially to provide the status/link feedback to the user. Via the first UI 310, different commands may be provided by the user, such as a trigger command to request to establish the link, a start-to-send command to request the start of actual data transfer. Potential commands can be:

Trigger the Li-Fi link
Switch on/off the transmitter
Switch on/off the Li-Fi transmitter
Start-to-send of the Li-Fi link
Stop-to-send of the Li-Fi link
Check link quality The first transmitter 320 is deployed to enable the other link, and to provide a low power communication channel for the signaling exchange between the user-held apparatus and the remote device. The Li-Fi transmitter 330 is deployed to enable the high-speed Li-Fi link.

Optionally, the user-held apparatus 300 may further comprise a Li-Fi receiver 340 to enable the opposite link to receive a file, a data packet, a data frame, or control signaling from the remote device. The user-held apparatus 300 may also comprise a second receiver 350 to enable the other link in the opposite direction, and a controller 360. And hence, the feedback on the alignment status from the remote device can be received by the second receiver 350 in the user-held apparatus via the other link 500. The controller 360 can judge if the alignment status is sufficient to allow for file transfer. And then, the high-speed Li-Fi link may start right away if the controller decided the alignment status is sufficient. The benefit is that less involvement of a user is needed, and the entire procedure is further shortened. This can be especially beneficial, considering it may help to relax the requirement on a time interval that the user has to hold the user-held apparatus stably in a fixed position to maintain the beam alignment. Alternatively, the alignment status can be used as an additional condition to the start-to-receive command received via the first UI before starting the file transfer.

Figure 3:
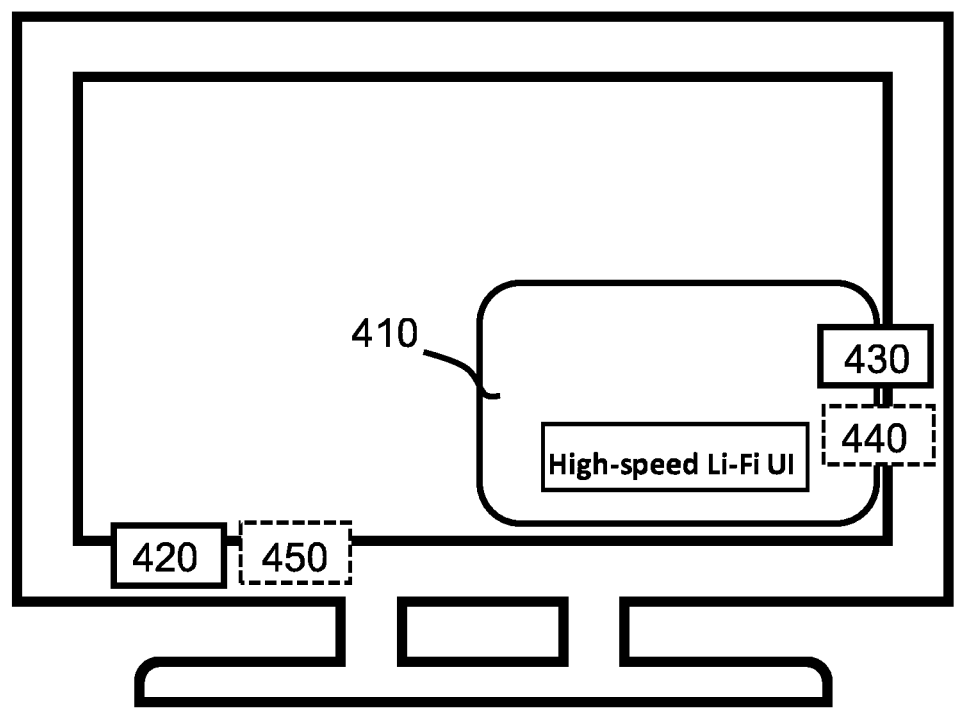
FIG. 3 illustrates the setup of a remote device.

FIG. 3 illustrates the setup of a remote device. The blocks with solid lines 410, 420, 430 are the most essential building blocks in the remote device 400. The second UI 410 is used to provide human perceivable indication of the dedicated reception area, or potentially the dedicated transmission area for the opposite link. Given that the relative size of the dedicated reception or transmission area for Li-Fi signals is typically much smaller as compared to the remote device, such a perceivable indication of the reception or transmission area can be very beneficial for the user to adjusting the position or orientation of the user-held apparatus, especially considering the high directivity of the high-speed Li-Fi link. Potentially, the second UI is also adopted to provide the feedback about the alignment status, or other feedbacks, such as proactive feedback on speeding up the link establishment or improving the link quality, to the user. The other feedbacks can be an instruction on a direction in which to adjust the position and/or an orientation of the user-held apparatus; link quality information of the high-speed Li-Fi link; and, a recommendation for further improving the link quality; and the feedback can be provided either directly via the second UI, or via a feedback signal. Thus, the system becomes more responsive, and it may also help to speed up the link establishment procedure for the high-speed Li-Fi link. The second receiver 420 is deployed to enable the other link 500 to receive the trigger signal from the user-held apparatus. The Li-Fi receiver 430 is deployed to enable the high-speed Li-Fi link.

The user perceivable indication provides the user with an immediate response from the remote device, which helps the user to quickly recognize the way of interaction between the apparatus at hand and the device from remote. And hence, the user can adjust the position and/or orientation of the user-held apparatus more efficiently. The user perceivable indication can be implemented in different manners, such as by illuminating the dedicated reception area, illuminating a light strip enclosing the dedicated reception area, displaying an arrow pointing to the dedicated reception area, displaying a description of a relative location of the dedicated reception area on the remote device, a voice or text message indicating the dedicated reception area. In one example, a particular form of an illuminated area could be to indicate a target spot to which the user should direct the beam, or the center position of the actual received beam. In another example, the remote device comprises a display area with the second Li-Fi receiver integrated behind the display. The human perceivable indication can be provided by presenting the dedicated reception area on the display directly. Optionally, the remote device further comprises a second transmitter 450 to send the aforementioned feedbacks to the user-held apparatus directly, and to allow autonomous control of the file transfer by the controller 360 comprised in the user-held apparatus, or to be used as one additional requirement for the actual file transfer after receiving the start-to-send command via the first UI. The remote device may also comprise a second Li-Fi transmitter to enable the opposite high-speed Li-Fi link to send a file to the user-held apparatus.

Figure 4:
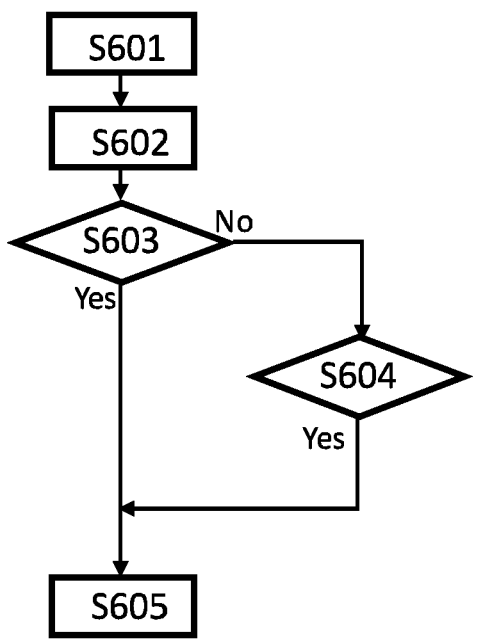
FIG. 4 shows a flow diagram of a method carried out by the user-held apparatus.

FIG. 4 shows a flow diagram of a method 600 carried out by the user-held apparatus 300. In step S601, a trigger command is received via the first UI 310 for establishing the high-speed Li-Fi link 200. In step S602, a trigger signal is sent to the remote device 400 via the first transmitter 320 upon receipt of the trigger command. And then depending on either an alignment status is determined to be sufficient to allow for file transfer in step S603, and/or reception of a start-to-send command in step S604, the user-held apparatus transmits a file via the Li-Fi transmitter to the remote device via the high-speed Li-Fi link in step S605. FIG. 4 shows the example that the two conditions, sufficient alignment status and receiving a start-to-send command, are used as alternatives. It is also possible that the two conditions are used in combination, and the actual file transfer will take place when both conditions are met.

Figure 5:
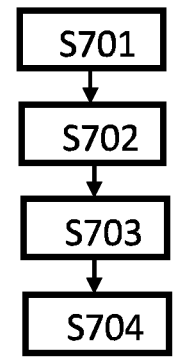
FIG. 5 shows a flow diagram of a method carried out by the remote device.

FIG. 5 shows a flow diagram of a method 700 carried out by the remote device 400. In step S701, the remote device receives a trigger signal from the user-held apparatus 300 for setting up the high-speed Li-Fi link 200 via a second receiver 420. In response to the trigger signal, in step S702 the remote device provides a human perceivable indication about a dedicated reception area on the remote device 400 via a second user interface 410. Furthermore, in step S703 the remote device 400 provides a feedback on an alignment status between a Li-Fi transmitter 330 comprised in the user-held apparatus 300 and the dedicated reception area. And then, in step S704 the remote device 400 receives a file by a second Li-Fi receiver 430 from the Li-Fi transmitter 330 via the high-speed Li-Fi link 200.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer.

Methods, systems and computer-readable media (transitory and non-transitory) may also be provided to implement selected aspects of the above-described embodiments.

The term "controller" is used herein generally to describe various apparatus relating to, among other functions, the operation of one or more user-held apparatus and/or remote devices. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified It should also be understood that, unless clearly indicated to the contrary, in any methods claimed herein that include

The invention claimed is:

1. A system for enabling high-speed file transfer via a high-speed Li-Fi link between a user-held apparatus and a remote device, the system comprising:
the user-held apparatus comprising a first transmitter, a Li-Fi transmitter a first user interface, UI;
the remote device comprising a second receiver, a second Li-Fi receiver a second UI; and
wherein the user-held apparatus is configured to:
send a trigger signal from the first transmitter to the remote device for setting up the high-speed Li-Fi link upon receipt of a trigger command via the first UI; and
the remote device is configured to:
provide a human perceivable indication via the second UI about a dedicated reception area on the remote device upon receipt of and in response to the trigger signal by the second receiver, to assist adjustment of a position and/or an orientation of the user-held apparatus to point the Li-Fi transmitter to the dedicated reception area;
provide feedback on an alignment status between the Li-Fi transmitter in the user-held apparatus and the dedicated reception area; and
the user-held apparatus is further configured to:
transmit a file from the Li-Fi transmitter to the second Li-Fi receiver in the remote device via the high-speed Li-Fi link when the alignment status provided by the remote device is determined to allow for file transfer, or a start-to-send command is received via the first UI; and
wherein the trigger signal sent from the first transmitter is via another optical link different from, and with wider beam width than, the high-speed Li-Fi link.

2. The system of claim 1, wherein the first transmitter and second receiver have a lower active power consumption than the Li-Fi transmitter and the second Li-Fi receiver, respectively.

3. The system of claim 1, wherein the feedback from the remote device further comprises at least one of:
an instruction on a direction in which to adjust the position and/or an orientation of the user-held apparatus;
link quality information of the high-speed Li-Fi link; and
a recommendation for further improving the link quality; and the feedback can be provided either:
directly via the second UI, or
via a feedback signal sent by a second transmitter comprised in the remote device via the other link to the user-held apparatus.

4. The system of claim 3, wherein the remote device is further configured to:
provide another feedback during or after the file transfer; and wherein the other feedback comprises at least one of: a status of transfer on-going, a status of transfer interrupted, a status of transfer completed, link quality information, an acknowledgement for receipt of the file, an acknowledgement for receipt of part of the file, and a negative acknowledgement for receipt of the file.

5. The system of claim 1, wherein the user-held apparatus is further configured to:
switch on the Li-Fi transmitter upon receipt of the trigger command via the first UI; and
switch off the Li-Fi transmitter after the transmission of the file to the remote device via the high-speed Li-Fi link is completed, or aborted by the user, or ended due to interruption.

6. The system of claim 1, wherein the remote device is further configured to:
switch on the second Li-Fi receiver upon receipt of the trigger signal; and
switch off the second Li-Fi receiver after the reception of the file from the user-held device via the high-speed Li-Fi link is completed, or aborted by the user, or ended due to interruption, or a predefined timer expires.

7. The system of claim 1, wherein the user-held apparatus is further configured to:
highlight a projected transmission area by emitting a visible light beam to further assist adjustment of a position and/or an orientation of the user-held apparatus to point the Li-Fi transmitter to the dedicated reception area on the remote device.

8. The system of claim 1, wherein the user-held apparatus further comprises a Li-Fi receiver, the remote device further comprises a second Li-Fi transmitter, and the user-held apparatus is configured to:
send a second trigger signal from the first transmitter to the remote device for setting up the high-speed Li-Fi link upon receipt of a second trigger command via the first UI; and the remote device is configured to:
provide a human perceivable indication via the second UI about a dedicated transmission area on the remote device upon receipt of the second trigger signal by the second receiver, to assist adjustment of a position and/or an orientation of the user-held apparatus to point the Li-Fi receiver to the dedicated transmission area; and the user-held apparatus is further configured to:
evaluate an alignment status between the Li-Fi receiver and the dedicated transmission area;
send a third trigger signal from the first transmitter to the remote device for starting the high-speed Li-Fi link when the alignment status is determined to allow for file transfer, or a start-to-receive command is received via the first UI; and the remote device is further configured to:
transmit a file from the second Li-Fi transmitter to the Li-Fi receiver via the high-speed Li-Fi link upon receipt of the third trigger signal.

9. A user-held apparatus for enabling high-speed file transfer to a remote device via a high-speed Li-Fi link, the user-held apparatus comprising:
a first user interface, UI, configured to receive a trigger command;
a first transmitter configured to send a trigger signal to the remote device for setting up the high-speed Li-Fi link upon receipt of the trigger command, wherein the remote device has a second user interface, UI;
a Li-Fi transmitter configured to transmit a file to a second Li-Fi receiver in the remote device via the high-speed Li-Fi link, when an alignment status provided by the remote device is determined to allow for file transfer, or a start-to-send command is received via the first UI; and wherein the trigger signal sent from the first transmitter is via another optical link different from, and with wider beam width than, the high-speed Li-Fi link, wherein the remote device provides a human perceivable indication via the second UI about a dedicated reception area on the remote device upon receipt of and in response to the trigger signal, to assist adjustment of a position and/or an orientation of the user-held apparatus to point the Li-Fi transmitter to the dedicated reception area.

10. The user-held apparatus of claim 9, the user-held apparatus further comprising:
   a first receiver configured to receive feedback on the alignment status from the remote device via the other link;
   controller configured to determine if the alignment status allows for file transfer.

11. A remote device for accommodating high-speed file reception from a user-held apparatus via a high-speed Li-Fi link, the remote device comprising:
   a second receiver configured to receive a trigger signal from the user-held apparatus for setting up the high-speed Li-Fi link;
   a second user interface, UI, configured to provide a human perceivable indication about a dedicated reception area on the remote device, upon receipt of and in response to the trigger signal;
   a second Li-Fi receiver configured to receive a file from a Li-Fi transmitter in the user-held apparatus via the high-speed Li-Fi link; and
   wherein the remote device is further configured to provide a feedback on an alignment status between the Li-Fi transmitter comprised in the user-held apparatus and the dedicated reception area; and
   wherein the trigger signal received by the second receiver is via another optical link different from, and with wider beam width than, the high-speed Li-Fi link.

12. The remote device of claim 11, the remote device further comprising a second transmitter; and wherein the second transmitter is configured to send the feedback on the alignment status to the user-held apparatus via the other link.

13. A method of a user-held apparatus enabling high-speed file transfer to a remote device via a high-speed Li-Fi link, the method comprising:
   receiving a trigger command via a first user interface, UI;
   sending a trigger signal from a first transmitter to the remote device for setting up the high-speed Li-Fi link upon receipt of the trigger command, wherein the remote device has a second user interface, UI;
   providing, via the second UI, a human perceivable indication about a dedicated reception area on the remote device upon receipt of and in response to the trigger signal, to assist adjustment of a position and/or an orientation of the user-held apparatus to point the Li-Fi transmitter to the dedicated reception area; and
   transmitting a file from a Li-Fi transmitter to a second Li-Fi receiver in the remote device via the high-speed Li-Fi link, when an alignment status provided by the remote device is determined to allow for file transfer, or a start-to-send command is received via the first UI, and wherein the trigger signal sent from the first transmitter is via another optical link different from, and with wider beam width than, the high-speed Li-Fi link.

14. A non-transitory computer readable medium comprising instructions which, when the instructions are executed by a processor of the user-held apparatus cause the processor comprised in the user-held apparatus to carry out the method of claim 13.

* * * * *